United States Patent
Stöger et al.

(10) Patent No.: US 11,334,027 B2
(45) Date of Patent: May 17, 2022

(54) METHOD AND OSCILLATION CONTROLLER FOR COMPENSATING FOR OSCILLATIONS OF AN OSCILLATABLE TECHNICAL SYSTEM

(71) Applicant: B&R INDUSTRIAL AUTOMATION GMBH, Eggelsberg (AT)

(72) Inventors: Andreas Stöger, Eggelsberg (AT); Thomas J. Frauscher, Eggelsberg (AT); Ralf Skotschek, Eggelsberg (AT)

(73) Assignee: B&R INDUSTRIAL AUTOMATION GMBH, Eggelsberg (AT)

( * ) Notice: Subject to any disclaimer, the term of this patent is extended or adjusted under 35 U.S.C. 154(b) by 0 days.

(21) Appl. No.: 16/687,102

(22) Filed: Nov. 18, 2019

(65) Prior Publication Data
US 2020/0159169 A1    May 21, 2020

(30) Foreign Application Priority Data

Nov. 19, 2018    (EP) .................................... 18207067

(51) Int. Cl.
*G04B 17/02*    (2006.01)
*B66C 13/06*    (2006.01)
(Continued)

(52) U.S. Cl.
CPC ............ *G04B 17/02* (2013.01); *B66C 13/063* (2013.01); *B66C 13/085* (2013.01); *B66C 13/46* (2013.01); *G04B 17/20* (2013.01)

(58) Field of Classification Search
CPC ..... B66C 13/066; B66C 13/06; B66C 13/085; G05B 2219/41217; G05D 19/02; G05D 1/0061; G05D 1/0858
See application file for complete search history.

(56) References Cited

U.S. PATENT DOCUMENTS 5,224,664 A * 7/1993 Adams, Sr. .............. G05B 5/01
                                                         244/17.13
5,832,730 A * 11/1998 Mizui ................... B66C 13/066
                                                         60/469

(Continued)

FOREIGN PATENT DOCUMENTS

DE      100 64 182       5/2002
EP      0 578 280        5/1996
(Continued)

OTHER PUBLICATIONS

Klaassens et al., "Modeling and control of Container Cranes", London: Cargo Systems, 2000, Proceedings, pp. 11-12.

(Continued)

*Primary Examiner* — Darrin D Dunn
(74) *Attorney, Agent, or Firm* — Greenblum & Bernstein, P.L.C.

(57) ABSTRACT

In order to eliminate control problems caused by a manipulated variable limitation in the oscillation control of an oscillatable technical system, a restriction $$\left(\frac{d^n u}{dt^n}_{min}, \frac{d^n u}{dt^n}_{max}\right)$$

of at least one time derivative of the manipulated variable (u) in a control law for calculating the manipulated variable (u) is taken into account.

21 Claims, 3 Drawing Sheets

(51) Int. Cl.
*B66C 13/08* (2006.01)
*B66C 13/46* (2006.01)
*G04B 17/20* (2006.01)

(56) References Cited

U.S. PATENT DOCUMENTS

| | | | | |
|---|---|---|---|---|
| 5,878,896 A * | 3/1999 | Eudier | B66C 13/063 | 212/270 |
| 5,908,122 A * | 6/1999 | Robinett | B66C 13/063 | 212/275 |
| 5,960,969 A * | 10/1999 | Habisohn | B66C 13/063 | 212/270 |
| 6,328,173 B1 * | 12/2001 | Wimmer | B66C 13/066 | 212/261 |
| 6,341,244 B1 * | 1/2002 | Papiernik | G05B 19/19 | 700/159 |
| 6,588,610 B2 * | 7/2003 | Ong | B66C 13/063 | 212/270 |
| 7,367,464 B1 * | 5/2008 | Agostini | B66C 13/063 | 212/308 |
| 7,831,333 B2 * | 11/2010 | Sawodny | B66C 13/085 | 700/213 |
| 7,832,711 B2 * | 11/2010 | Miyoshi | B66C 23/18 | 254/270 |
| 8,235,231 B2 * | 8/2012 | Schneider | B63B 27/10 | 212/308 |
| 9,108,826 B2 * | 8/2015 | Eriksson | G01C 9/08 | |
| 9,266,700 B2 * | 2/2016 | Schneider | B66C 13/085 | |
| 9,278,829 B2 * | 3/2016 | Benosman | B66B 7/06 | |
| 9,556,006 B2 * | 1/2017 | Schneider | B66C 13/04 | |
| 9,862,570 B2 * | 1/2018 | Benosman | B66B 9/00 | |
| 10,118,775 B2 | 11/2018 | Walter et al. | | |
| 2002/0158036 A1 * | 10/2002 | Ong | B66C 13/063 | 212/275 |
| 2007/0289931 A1 | 12/2007 | Henriksson | | |
| 2008/0156761 A1 * | 7/2008 | Schneider | B66C 13/063 | 212/273 |
| 2008/0271329 A1 * | 11/2008 | Voecks | G01C 9/12 | 33/345 |
| 2008/0281464 A1 * | 11/2008 | Sorensen | B66C 13/063 | 700/213 |
| 2009/0050593 A1 * | 2/2009 | Ladra | B66C 13/063 | 212/275 |
| 2010/0019519 A1 * | 1/2010 | Boselli | B21B 31/12 | 294/67.5 |
| 2010/0230370 A1 * | 9/2010 | Schneider | B66C 23/52 | 212/276 |
| 2010/0243392 A1 * | 9/2010 | Sloth | E04H 9/0215 | 188/378 |
| 2011/0079678 A1 * | 4/2011 | Brenner | B64D 1/22 | 244/17.13 |
| 2013/0032561 A1 * | 2/2013 | Singhose | B66C 13/063 | 212/273 |
| 2013/0213919 A1 * | 8/2013 | Kyllingstad | B66C 13/04 | 212/272 |
| 2013/0245816 A1 * | 9/2013 | Langer | B66C 13/18 | 700/228 |
| 2014/0224755 A1 * | 8/2014 | Eriksson | G01C 9/08 | 212/273 |
| 2015/0344271 A1 | 12/2015 | Schneider et al. | | |
| 2016/0176692 A1 * | 6/2016 | Sawodny | E06C 5/04 | 701/50 |
| 2016/0194183 A1 * | 7/2016 | Kyllingstad | B66C 13/066 | 212/272 |
| 2016/0200554 A1 * | 7/2016 | Moran | B66C 13/22 | 701/50 |
| 2016/0380562 A1 | 12/2016 | Weber et al. | | |
| 2018/0050889 A1 * | 2/2018 | Fakkeldij | B66C 19/007 | |
| 2018/0093868 A1 * | 4/2018 | Claeys | B66C 13/063 | |
| 2018/0229976 A1 * | 8/2018 | Kawai | B66C 13/28 | |
| 2018/0339888 A1 * | 11/2018 | Staudecker | B66C 13/063 | |
| 2019/0193998 A1 * | 6/2019 | Ladra | B66C 13/063 | |
| 2019/0345007 A1 * | 11/2019 | Niemela | B66C 13/48 | |
| 2020/0049203 A1 * | 2/2020 | Kimman | G03F 7/70758 | |

FOREIGN PATENT DOCUMENTS

| | | |
|---|---|---|
| EP | 2 952 466 | 12/2015 |
| EP | 3 109 998 | 12/2016 |
| EP | 3 243 772 | 11/2017 |
| EP | 3 305 710 | 4/2018 |

OTHER PUBLICATIONS

Europe Office Action/Search Report conducted in counterpart Europe Appln. No. 18207067.2 (dated May 29, 2019).

* cited by examiner

METHOD AND OSCILLATION CONTROLLER FOR COMPENSATING FOR OSCILLATIONS OF AN OSCILLATABLE TECHNICAL SYSTEM

CROSS-REFERENCE TO RELATED APPLICATIONS

The present application claims priority under 35 U.S.C. § 119(a) of Europe Patent Application No. 18 20 7067.2 filed Nov. 19, 2018, the disclosure of which is expressly incorporated by reference herein in its entirety.

BACKGROUND

1. Field of the Invention

The present invention relates to a method for compensating for oscillations of at least one oscillation variable to be controlled of an oscillatable technical system with an oscillation controller with a control law, which calculates, from a target value and an actual value and/or a time derivative of a target value and an actual value of the oscillation variable to be controlled, a manipulated variable for an actuator of the oscillatable technical system. The invention also relates to a corresponding oscillation controller.

2. Discussion of Background Information

Hoists, especially cranes, are available in many different embodiments and are used in many different fields of application. For example, there are tower cranes, which are mainly used for building construction and civil engineering, or there are mobile cranes, e.g. for the installation of wind turbines. Likewise, lifting devices in high-bay warehouses (so-called stacker cranes) are known. Bridge cranes are used, for example, as overhead cranes in factory halls, and gantry cranes are used, for example for the manipulation of transport containers (e.g. containers) at transshipment locations for intermodal cargo handling, such as in ports for transfer from ships to the railroad or trucks or to freight yards for transfer from the railroad to the truck or vice versa. Predominantly, the goods are stored for transport in standardized containers, so-called ISO containers, which are equally suitable for transport in the three modes of transport, road, rail, water. The structure and operation of a gantry crane is well known and is described for example in US 2007/0289931 A1 using a "ship-to-shore crane." The crane has a supporting structure or a portal on which a boom is arranged. The portal with wheels, for example, is arranged movably on a track and can be moved in one direction. The boom is firmly connected to the portal and on the boom in turn a trolley that is movable along the boom (generally a support element) is arranged. To accommodate a load, for example an ISO container, the trolley is connected by means of ropes to a load-bearing element, for example a so-called spreader. For bearing and manipulating a load, the load-bearing element can be raised or lowered by means of winches, in this case by means of two winches in each case for two ropes. The load-bearing element can also be adapted to different sized loads.

In order to increase the efficiency of logistics processes, inter alia, a very rapid cargo handling is required, i.e., for example, very fast loading and unloading operations of cargo ships and correspondingly fast movements of the load-bearing elements and the gantry cranes as a whole. Of course, the same applies analogously to other lifting or conveying devices. However, such rapid movements of the load can lead to build up unwanted oscillations of the load-bearing element, which in turn delay the manipulation process, since the load cannot be placed precisely at the intended location. In this case, torsional oscillations of the load-bearing element, i.e. oscillations about a vertical axis (skew), longitudinal axis (list) and/or transverse axis (trim) of the load can occur, with torsional oscillations typically occurring about the vertical axis or being relevant in lifting devices. Likewise, the load-bearing element suspended on the rope can be deflected by movement processes in a direction of movement of a part of the lifting device, for example, the trolley and/or portal, which can also lead to pendulum oscillations of the load-bearing element (so-called sway).

Due to the structural design of the lifting device, based on the load-bearing element, this involves a weak or undamped oscillatable mechanical system. This means that the oscillatable part of the mechanical system has no or only a weak inherent damping, whereby occurring oscillations are not or only very weakly damped. The movement of the oscillatable part of the mechanical system can be described by a second-order differential equation (often referred to as PT2 element in system theory) or higher order. In addition to lifting devices there are of course still other oscillatable mechanical systems with or without damping, for example, a mechanical system with a load suspended so as to swing like a pendulum on a driven, moving part as an oscillatable part. The movement of the load can be described with a second-order differential equation. The moving part may for example be a vehicle of a conveyor device, for example a vehicle with a long stator linear motor for conveying loads, as described, for example, in EP 3 109 998 A1 or EP 3 243 772 A1. The pendulum can also be designed as a stiff, flexible arm fixedly clamped to the vehicle. The movement of the flexible arm can in turn be described by a second-order differential equation. A moving vehicle with a container in which there is a liquid that sloshes due to the movement is also an example of this. The movement of the liquid can be described in a good approximation by a second-order differential equation. Also in this case, this may be a vehicle of a conveyor device, such as a long stator linear motor. A combination of these is also conceivable, i.e., for example, a container suspended on a moving vehicle with a sloshing liquid. It is obvious that there is a plethora of such oscillatable mechanical systems, whereby the motion of an oscillatable part of the mechanical system can be described with a differential equation of at least second order.

In addition to mechanical oscillatable systems, there are, of course, other oscillatable technical systems, such as electrical oscillatable systems (electrical oscillating circuits) or hydraulic or pneumatic oscillatable systems. Also such oscillations can be described in a similar way by a differential equation of second order or higher order.

In general, the invention relates to oscillatory technical systems that can be described by physical variables, such as a degree of freedom of movement, an electrical voltage, an electric current, a pressure, a volume or mass flow, etc., wherein at least one physical variable (designated as an oscillation variable) can be excited to periodic oscillations. By at least one actuator, for example a drive of a moving part of a mechanical system (e.g. lifting device or long stator linear motor), a hydraulic pump, an electrical voltage or current source, etc., the oscillatable technical system can be influenced from outside to influence the oscillation variable. The oscillation of the at least one oscillation variable can be described mathematically/physically by a differential equation of the second or higher order. Such oscillations are usually undesirable in normal operation and should therefore be compensated for.

In order to compensate for the oscillation in the operation of the oscillatory technical system, an oscillation controller is often implemented which calculates a manipulated variable for an actuator of the technical system in order to influence the oscillation variable for damping the oscillation. The actuator can be varied depending on the design of the oscillatable technical system. For example, in the case of a lifting device, the speed of a trolley (as an actuator) can be calculated as a manipulated variable in order to compensate for pendulum oscillations in the direction of movement of the trolley. Likewise, in the case of a lifting device, the rope length of a rope of the load-bearing element can be calculated as a manipulated variable and adjusted by a rope length adjustment unit (as an actuator) in order to compensate for torsional oscillations. In a vehicle of a long stator linear motor (as an actuator), the speed of the vehicle to be set can be calculated as a manipulated variable to compensate for a pendulum oscillation of a swinging suspended load or the sloshing movement of a liquid in a container on the vehicle. In a hydraulic system, the pressure and/or the flow (as a manipulated variable) of a hydraulic fluid can be influenced by a hydraulic pump. In an electrical system, an impressed electrical voltage and/or an impressed current can be used as the manipulated variable. Of course, depending on the design of the oscillatable technical system, other actuators and manipulated variables are possible.

In addition, it is often desirable or necessary to adjust the oscillation variable of the oscillatable technical system to a certain predetermined target value, for example, a specific position to be reached or a twist angle of a load-bearing element of a hoist, the position of a vehicle of a long stator linear motor, an output voltage of an electric oscillation circuit, a hydraulic pressure of a hydraulic circuit, etc. Such an oscillation variable control can be combined with the oscillation control. In this case, the target value of the oscillation variable is adjusted and oscillations of the oscillation variable are compensated for the target values.

In each technical system, the manipulated variables for the actuator are limited by physical specifications. For example, the maximum achievable speed of the trolley of a lifting device or of the vehicle of a long stator linear motor is limited by the design of the drive. The same applies analogously to the possible adjustment range of a rope length adjustment unit or any other mechanical actuator. With a hydraulic pump, only a maximum pressure and/or flow rate, or a time derivative thereof, can be achieved. Likewise, with a voltage or current source only a certain voltage or a certain current can be generated. Typical examples of physical limitations of an electric motor are a maximum motor voltage of an electric motor, resulting in a speed restriction or a maximum motor current, resulting in an acceleration restriction. A mechanical construction is limited, for example, by the mechanical strength, resulting in a force restriction. Similarly, there are corresponding physical restrictions for other types of actuators. The manipulated variables calculated by the oscillation controller, possibly in combination with the oscillation variable controller, are consequently limited due to the given restrictions and the actuator receives only the limited manipulated variable. However, restrictions on a time derivative of the manipulated variable, i.e. how fast a manipulated variable can or should be changed, are often taken into account. Due to the manipulated variable limitation taking place in the controller after the calculation of the manipulated variable, a time shift of the manipulated variable (phase shift) and possibly also a limitation of the value of the manipulated variable is introduced. Thus, especially at high oscillation amplitudes, the oscillation controller can no longer or only insufficiently damp the oscillation of the oscillation variable. In extreme cases (with a correspondingly large phase shift), the oscillation could even be amplified by the oscillation controller with manipulated variable limitation, which can also lead to instability.

In J. B. Klaassens, et al., "Modeling and Control of Container Cranes," London: Cargo Systems, 2000, Proceedings, p. 11-12 describes an oscillation control system for a container crane designed to compensate for oscillatory oscillations (sway) and torsional oscillations (skew). In order to reduce the influence of a manipulated variable limitation and to ensure compliance with restrictions on trolley speed and trolley acceleration, it is provided that the controller gain parameters are adapted adaptively. However, it does not elaborate how this adaptive adaptation occurs.

SUMMARY

Embodiments of the invention eliminate the problems associated with a manipulated variable limitation in the oscillation control of an oscillatable technical system, but at least to reduce.

According to embodiments, a restriction of at least one time derivative of the manipulated variable is taken into account in the control law for calculating the manipulated variable. This calculated manipulated variable can be transferred to the actuator for adjustment. Thus, it is no longer necessary to subsequently limit the calculated manipulated variable, but the calculated manipulated variable (possibly in a sum with other manipulated variables, e.g. from a feedforward) can be used directly in the actuator, because the restriction has already been taken into account. With this approach, there is no phase shift due to the restriction, whereby the associated negative effects on the control can be avoided.

In an advantageous embodiment, the control law contains a controller parameter that is dependent on the restriction of the at least one time derivative of the manipulated variable. Preferably, the controller parameter is a damping to be introduced into the oscillatable technical system, which can be adapted in this way to the predetermined restriction. It is particularly advantageous if the controller parameter is dependent on an oscillation amplitude of the oscillation and/or an amplitude of a time derivative of the oscillation, because thus the controller parameters, particularly preferably the damping, can be adaptively adapted to the current oscillation. This makes it possible, for example, to damp more strongly at a smaller oscillation amplitude than at a larger oscillation amplitude, with which oscillations can be compensated for more quickly.

The oscillation amplitude can be measured, but is preferably calculated with an oscillation amplitude observer, which calculates the oscillation amplitude of the oscillation and/or the amplitude of a time derivative of the oscillation from time derivatives of the actual values and the target values of the oscillation variable to be controlled. In this way, it is possible to dispense with additional measuring devices for measuring the amplitude, since the oscillation amplitude and the amplitudes of the derivatives can be estimated from existing measured variables.

In the calculation of the manipulated variable, a dead time of the oscillatable technical system is preferably taken into account, preferably by calculating a control error lying by the dead time in the future and taking this future control error into account in the calculation of the manipulated variable. In many technical systems the dead time can be considerable. By taking into account the dead time, the control quality of the oscillation control can be significantly improved.

Preferably, a feedforward control is implemented, which calculates a feedforward control manipulated variable from target values of the oscillation variable, which is added to determine the manipulated variable for the actuator with the manipulated variable calculated by the oscillation controller. By means of the feedforward control the oscillation controller only needs to compensate for smaller control errors, which can improve the dynamics of the control.

Particularly advantageously, an oscillation variable controller is implemented, which compensates for the deviation between a target value of the oscillation variable to be controlled and a final value of the oscillation variable, as the value of the oscillation variable reached after the oscillation. Thus, an advantageous decoupling of the oscillation controller from the oscillation variable controller is achieved, whereby the control behavior of the oscillation controller is not affected by the oscillation variable control. For this purpose, the final value can simply be calculated in a final value observer, which calculates a constant component of the oscillation of the oscillation variable to be controlled as the final value.

Other exemplary embodiments and advantages of the present invention may be ascertained by reviewing the present disclosure and the accompanying drawing.

BRIEF DESCRIPTION OF THE DRAWINGS

In the following, the present invention is described in greater detail with reference to FIGS. 1 to 6 which, by way of example, show schematic and non-limiting advantageous embodiments of the invention. In the drawings

DETAILED DESCRIPTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

As already mentioned, the oscillation control according to the invention can in principle be applied to any oscillatable technical system in which an oscillation of an oscillation variable of the technical system can be described by a differential equation of at least second order. An oscillation variable is a temporally variable physical variable, e.g. velocity, acceleration, electrical current, electrical voltage, pressure, flow, etc., with which the time-variant behavior of the oscillatable technical system can be described. By way of example and without limitation, the invention is described below using the example of a lifting device as an oscillatable technical system 1, wherein the following statements can be analogously transferred to any other oscillatable technical system with an oscillation variable.

Figure 1:
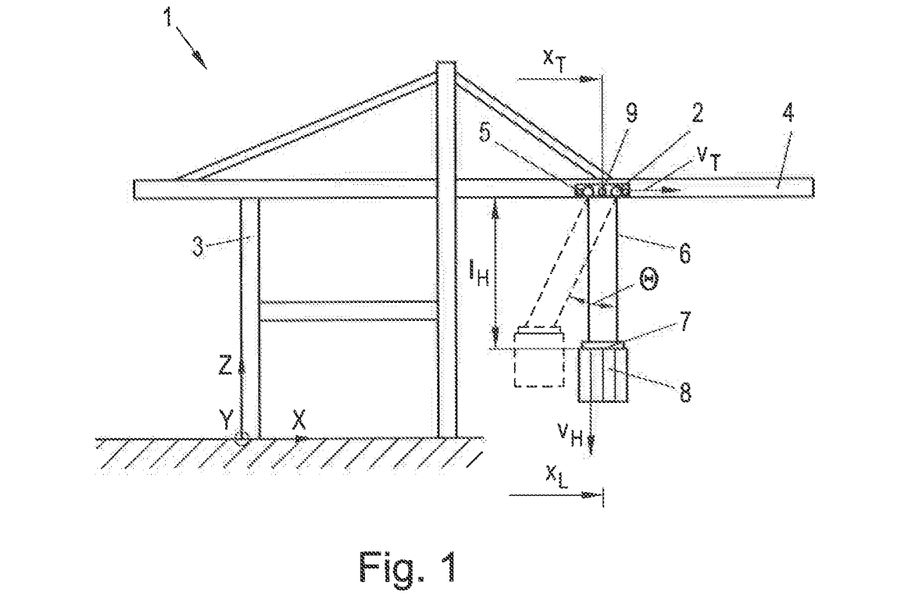
FIG. 1 shows a lifting device as an example of an oscillatable technical system.

FIG. 1 shows a lifting device in the form of a gantry crane, which is used, for example, for loading and unloading ships in a harbor. The lifting device has a supporting structure 3, which is arranged either fixed or movable on the ground. In the case of a movable arrangement, the supporting structure 3 can be arranged movably on rails, for example in the Y direction. The supporting structure 3 has a boom 4 which is fixedly connected to the supporting structure 3. On this boom 4 a support element 5 is usually arranged, which is movable in the longitudinal direction of the boom 4, that is in the illustrated example in the X direction. For example, a support element 5 may be movably supported by rollers in guides on the boom 4. The support element 5 is usually connected by holding elements 6, for example a rope or belt, with a load-bearing element 7 for bearing a load 8. The holding elements 6 are usually designed as ropes, wherein in most cases four holding elements 6 are arranged on the support element 5, but also more or fewer holding elements 6 can be provided. The load-bearing element 7 is thus arranged on the holding elements 6 swinging on the movable support element 5 and is thus capable of oscillation.

For bearing a load 8, such as a container, the rope length $l_H$ is adjustable between the support element 5 and the load-bearing element 7 by a lifting drive 2, as shown in FIG. 1, for example in the Z direction. Thus, the load-bearing element 7 can be lifted at a lifting speed $v_H$, that is, moved in the Z direction. If the holding elements 6 are designed as ropes, the rope length $l_H$ is usually adjusted by one or more winches. The support element 5 can be moved on the boom 4 by a support element drive 9 with a support element speed $v_T$. Generally speaking, the support element 5 is the moving part of the oscillatable technical system and the load-bearing element 7 connected thereto is the oscillatable part of the oscillatable technical system 1. The support element position $x_T$ of the support element 5 and the load position $x_L$ of the load-bearing element 7 are each related to a given coordinate system. Due to a possible pendulum oscillation of the load-bearing element 7 (indicated by dashed lines in FIG. 1), the load-bearing element 7 deflects by the angle $\theta$ and the support element position $x_T$ and the load position $x_L$ do not usually coincide. Of course, pendulum oscillations in the other directions are also possible, that is, for example, in the Y direction when the supporting structure 3 moves in the Y direction or in the Z direction, wherein the oscillations can also overlap.

Figure 2A:
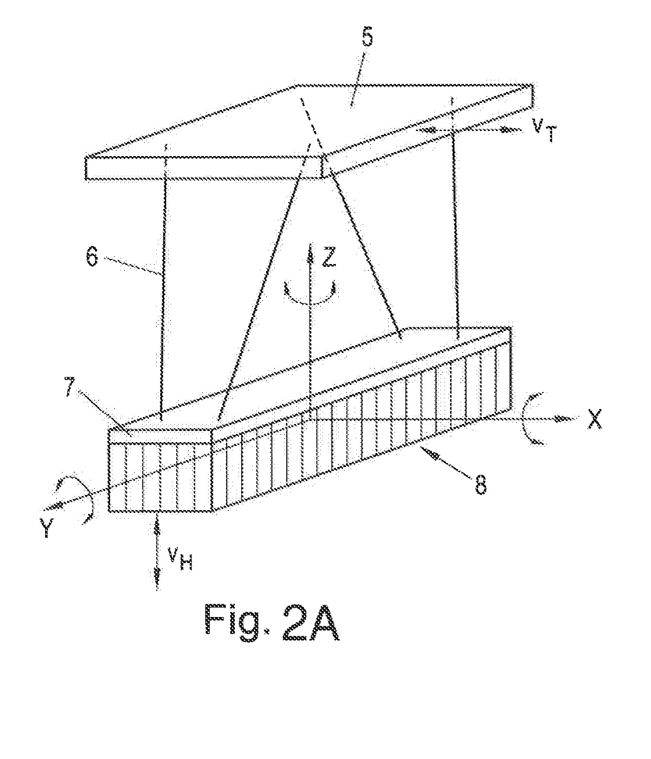
FIGS. 2A and 2B show degrees of freedom of oscillation of a load-bearing element of the lifting device.
Figure 2B:
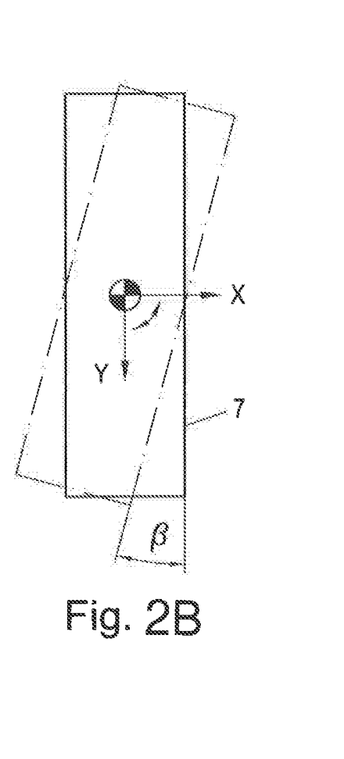

In addition to a pendulum oscillation of the load-bearing element 7, torsional oscillations of the load-bearing element 7 can also occur, as will be explained with reference to FIGS. 2A and 2B. The curved double arrows symbolize the possible rotations of the load-bearing element 7 about the respective axis. In this case, rotations about the X-axis (trim), the Y-axis (list) and the Z-axis (skew) are possible. A rotation about the Z-axis (i.e. around the vertical axis) about the angle $\beta$ is shown in FIG. 2B.

Generally speaking, an oscillation of an oscillation variable of the technical system 1 occurs. In an embodiment of the lifting device of FIG. 1, an oscillation occurs in at least one degree of freedom of movement (X, Y, Z or a torsional oscillation about one of the three axes) of the load-bearing element 7 of the technical system 1, as oscillation variable y. It is obvious that oscillations of several oscillation variables, for example a pendulum oscillation in the X direction and a rotational oscillation about the vertical axis of a lifting device, can occur simultaneously.

Oscillations of an oscillation variable y of the oscillatable technical system 1 (e.g. a lifting device) can be effected by internal or external excitations. Internal excitations result from the operation of the technical system, for example, by movements of the moving part (supporting structure 3 and/or support element 5) of the lifting device or by unevenly distributed loads 8. External excitations can be external influences, such as wind. Such oscillations are disturbing in the operation of the technical system 1, for example, because the achievable throughput of a crane system is reduced or because uncontrolled oscillations represent a danger to operating personnel and/or the load, and should be compensated during operation. The term "compensating" is to be understood to mean, preferably as quickly as possible, reducing occurring oscillation amplitudes. For this purpose, an operating controller 10 (hardware and/or software) is provided for the technical system 1, in which an oscillation control unit 16 according to the invention is implemented with an oscillation controller 11, which compensates such oscillations of the at least one oscillation variable y, and is generally explained with reference to FIG. 3. The operating controller 10 may be implemented on a stand-alone hardware, but may also be implemented in a plant control unit of the technical system 1 as hardware.

For the oscillation control, the oscillation controller 11 in each time step of the control, can be provided with a target value $y_{set}$ for the respective oscillation variable to be controlled. In general, however, the oscillation controller 11 does not require a target value $y_{set}$, since only the oscillation is compensated for by the oscillation controller 11. In each time step of the control, the oscillation controller 11 calculates a new value of the control quantity u. For a torsional oscillation in a lifting device, as shown in FIGS. 2A, 2B, the target value $y_{set}$ could be, for example, a target rotational angle $\beta_{set}$, usually an angle of zero. In the case of a pendulum oscillation in a lifting device as shown in FIG. 1, this would be, for example, a target deflection angle $\theta_{set}$, usually an angle of zero. However, since the deflection angle $\theta$ is proportional to the load position $x_L$, the support element position $x_T$ and the rope length $l_H$ (the same applies analogously to the Y direction), according to the relationship $$\theta = \arcsin\frac{x_L - x_T}{l_H},$$

a target load position $x_{Lset}$ could also be used directly as target value $y_{set}$. Since the load position $x_L$ ($y_L$) is preferably controlled in a lifting device, this is advantageous. The oscillation variable y is then the load position $x_L$ ($y_L$). If a plurality of oscillations are compensated for, then the target value $y_{set}$ can also be a vector with multiple entries, for example, a target rotational angle $\beta$ and a target load position $x_{Lset}$ ($y_{set}$).

Figure 3:
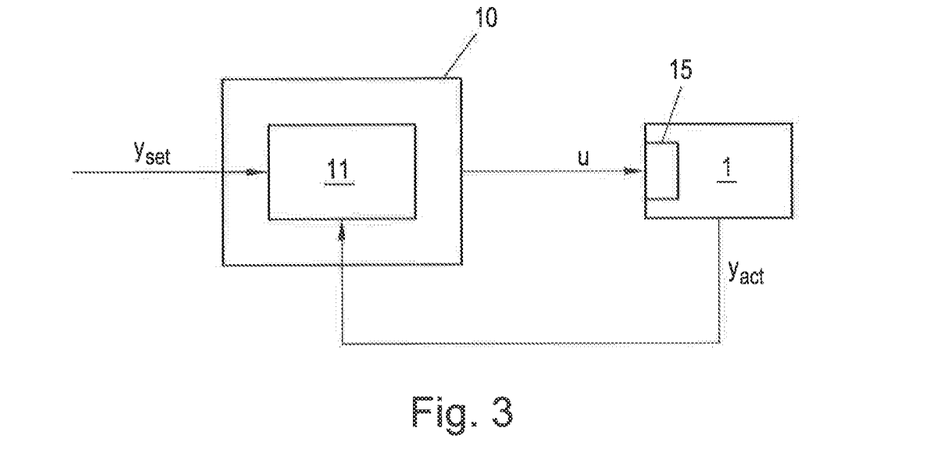
FIG. 3 shows an operating controller of the technical system with an oscillation control of an oscillation variable.

An actual value $y_{act}$ is measured on the oscillatable technical system 1 or also calculated from measured or otherwise available quantities, for example in a sufficiently well-known observer. The actual value $y_{act}$ is fed to the oscillation controller 11, which calculates therefrom and from the target value $y_{set}$ according to the implemented control law (usually software) a manipulated variable u, with which an actuator 15, e.g., a drive of a moving part of a mechanical system (e.g. lifting device or long stator linear motor), a hydraulic pump, an electrical voltage or current source, etc., of the oscillatable technical system 1 is controlled. In an analogous manner, the actual value $y_{set}$ can be a vector with several entries for the required actual values in the case of several oscillation variables y. The actuator 15 is, for example, the support element drive 9, which adjusts a support element speed $v_T$ as a manipulated variable u in order to influence the oscillation in the X direction. The actuator 15 may also be a rope length adjustment unit or a lifting drive 2, to adjust the rope length $l_H$ at least one holding element 6 in order to influence a torsional oscillation about the vertical axis. In this case, the manipulated variable u may be an adjustment speed $v_S$ or an adjustment position of the at least one holding element 6. Several actuators 15 are also possible. In other embodiments of the oscillatable technical system 1, of course, other target values $y_{set}$, actual values $y_{act}$, manipulated variables u and/or actuators 15 are also conceivable.

Figure 4:
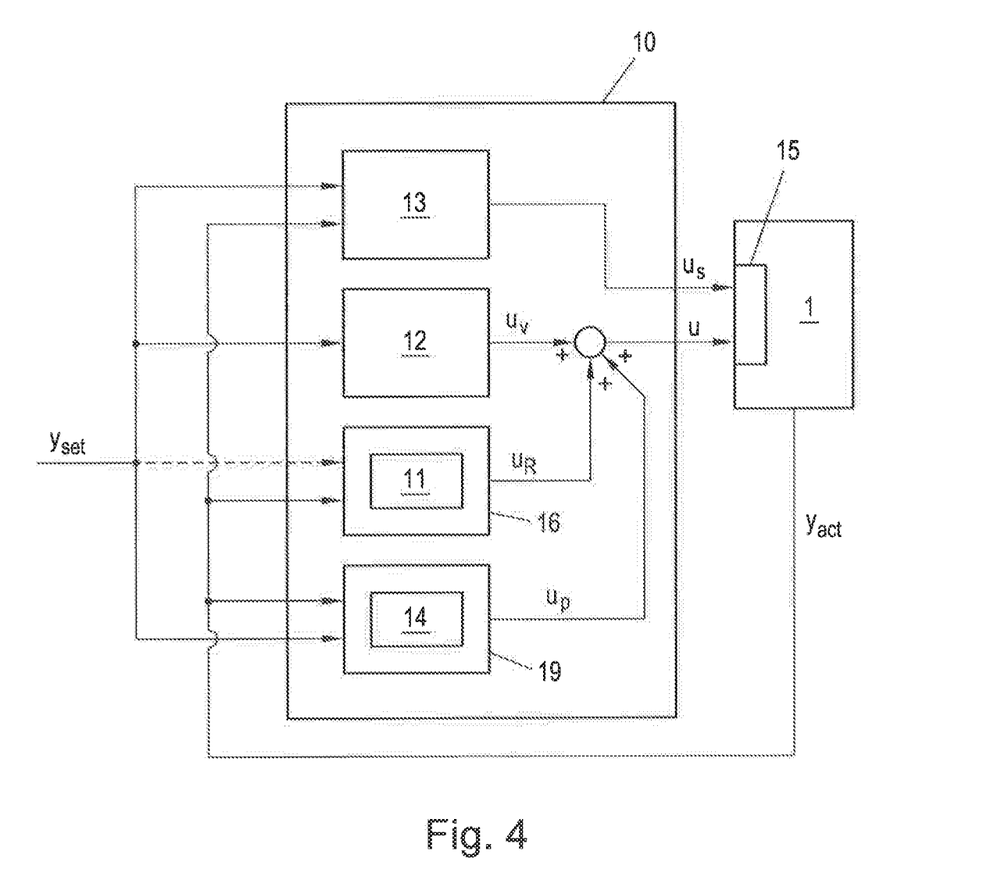
FIG. 4 shows an operating controller of a lifting device with oscillation control, feedforward control, oscillation variable control and rope length control.

In the operating controller 10 other controllers (usually as hardware and/or software) can also be implemented, as will be explained in more detail with reference to FIG. 4. In a feedforward control 12, a feedforward control manipulated variable $u_V$, for example a support element speed $v_{TV}$ or adjustment speed $v_{SV}$ of the rope adjustment, can be calculated from the target value $y_{set}$. For this purpose, any feedforward control law can be implemented which calculates the feedforward control manipulated variable $u_V$ from the target value $y_{set}$, i.e. $u_V = f(y_{set})$. Depending on the specific implementation of the feedforward control 12, additional measured values or estimated values of specific physical quantities of the technical system 1 can be taken into account in the feedforward control 12. For this purpose, the target value $y_{set}$ can also be a vector having a plurality of vector elements, for example a target load position $x_{Lset}$ (also in several directions X, Y, Z) or a rotational angle β, and time derivatives of the target value $y_{set}$, thus for example $$\frac{dy_{set}}{dt} \text{ (speed)}, \quad \frac{d^2 y_{set}}{dt^2} \text{ (accleration)}, \quad \frac{d^3 y_{set}}{dt^3} \text{ (jerk) and/or } \frac{d^4 y_{set}}{dt^4} \text{ (snap)}$$

and possibly even higher derivatives. The feedforward control manipulated variable $u_V$ is then added as usual with the controller manipulated variable $u_R$ calculated by the oscillation controller 11 to calculate the manipulated variable u for the actuator 15 of the mechanical system 1. The oscillation controller 11 only has to compensate for small control deviations remaining after the feedforward control.

Likewise, in the case of a lifting device, a rope length controller 13 (usually software) can be implemented, which calculates from the target value $y_{set}$ a manipulated variable us for a rope length adjustment, for example via a rope length adjusting unit as an actuator 15. In other technical systems, of course, no rope length controller 13 is provided, or it is replaced by the control of another variable to be controlled. Also for the control of the rope length $l_H$, a feedforward control manipulated variable for the rope length adjustment could be calculated in the feedforward control 12, which is then added to the manipulated variable us with the manipulated variable calculated in the rope length controller 13.

Furthermore, an oscillation variable controller 14 may also be implemented in an oscillation variable control unit 19, for example the position of the moving part of the oscillatable technical system 1, for example the support element 5 or the position of a vehicle of a long stator linear motor, according to the implemented control law, possibly also in several directions X, Y. Without the oscillation variable controller 14, only the disturbing oscillation of the oscillation variable y, that is to say, for example, only a pendulum oscillation and/or torsional oscillation of the load-bearing element 7, is corrected in the current position. This oscillation variable controller 14 additionally controls the oscillation variable y, for example the load position $x_L$ ($y_L$), to a predefined target value (which is contained in $y_{set}$). The manipulated variable up calculated by the oscillation variable controller 14 can be added to the other manipulated variables $u_V$, $u_R$ in order to obtain the manipulated variable u for the at least one actuator 15. The feedforward control 12 and the oscillation variable controller 14 can be combined as desired with the oscillation controller 11. It is also irrelevant whether the individual controllers are implemented in whole or in part as independent hardware with appropriate software or whether all or part of the controllers are implemented as software on a common hardware. The individual controllers will be explained in detail below.

It is obvious that the actuator 15 can also consist of several different actuators, depending on the design of the technical system 1 and/or depending on which controllers are implemented or used.

The target value $y_{set}$ for an oscillation variable, e.g. load position $x_L$ or rotational angle β, can either be specified at each time step of the control, usually in the 1-100 millisecond range. But also a trajectory can be defined as a target value $y_{set}$ for the oscillation variable. The trajectory contains not only a time course of the oscillation variable, for example, a time course of position or angle specifications, but also a time course of dynamic variables (kinematics), i.e. of time derivatives of the time course of the oscillation variable. The trajectory can be used in a lifting device, for example, to move the load-bearing element 7 from an initial position along a certain path and with a specific kinematics to an end position. A trajectory is used in particular for lifting devices for applications to move the load-bearing element 7 as quickly and safely as possible from the initial position to the end position.

For the design of an oscillation controller 11, one first requires a model of the controlled system, i.e. a model of the oscillation of the oscillation variable y to be controlled. The movement of the load-bearing element 7 of a lifting device as a technical system 1 can, for example, generally be modeled in state space representation with a system equation in the $$\text{form} \frac{d}{dt}\begin{pmatrix} y \\ \frac{dy}{dt} \\ \frac{d^2y}{dt^2} \end{pmatrix} = \begin{pmatrix} 0 & 1 & 0 \\ 0 & 0 & 1 \\ 0 & -\omega_0^2 & -2\xi_0\omega_0 \end{pmatrix} \begin{pmatrix} y \\ \frac{dy}{dt} \\ \frac{d^2y}{dt^2} \end{pmatrix} + \begin{pmatrix} 0 \\ 0 \\ i_a\omega_0^2 \end{pmatrix} u.$$

This model results from the mathematical modeling of the oscillation of the load-bearing element 7 as an oscillatable part of the technical system 1. Therein, y stands for the oscillation variable y to be controlled in a degree of freedom of movement, that is to say, for example, the load position $x_L$ ($y_L$) or the rotational angle β. u is the manipulated variable, for example a support element speed $v_T$ of the support element 5 or an adjusting speed $v_S$ of a holding element 6. $i_B$ is a known system gain, $\xi_0$ is a system damping and $\omega_0$ is the natural frequency. These parameters are therefore system parameters of the oscillatable technical system 1 and result from the concrete realization of the technical system 1 and can be assumed to be known. These system parameters are either given or known or can also be determined using known system identification methods, for example by parameter estimation methods. Thereby the technical system 1 is stimulated and the reaction is evaluated to estimate the system parameters. This applies in principle to every oscillatable technical system 1. The natural frequency $\omega_0$ is dependent on the rope length $l_H$ in a load-bearing element 7 of a lifting device and can be stored as a function of the rope length $l_H$ (for example as a characteristic curve or characteristic map), or can be calculated. For a pendulum oscillation, the natural frequency $$\omega_0 = \sqrt{\frac{g}{l_H}}$$

is given by the gravitational acceleration g. For a torsional oscillation, the natural frequency $\omega_0$ can be identified and stored for different rope lengths $l_H$.

Of course, another system equation for the movement of the oscillatable part, i.e. for the oscillation variable y, can also result for another oscillatable technical system 1. Likewise, it is not necessary to model the technical system 1 in the state space representation. The above system equation is therefore merely exemplary and serves to explain the invention.

For the underlying system equation, an oscillation controller 11 with a desired control law is now to be designed, which can be done with well-known control methods, such as Ackermann set, pole placement, frequency characteristic method, etc.

According to the invention, based on the system equation, an oscillation controller 11 is designed with a control law that calculates a manipulated variable u in order to compensate for the oscillation, i.e. to damp it. Preferably, an oscillation controller 11 is designed which introduces a desired damping $\xi_{set}$ to damp the weakly damped or undamped oscillatable technical system 1. This results in general in a control law for the oscillation controller 11 in the form $u=f(\xi_{set})$, for example, for the above system equation $$u = \left(\frac{d^2y_{set}}{dt^2} - \frac{d^2y_{act}}{dt^2}\right)\frac{2(\xi_{set} - \xi_0)}{\omega_0 i_B}.$$

Therein, $y_{set}$ stands for the target value of the oscillation variable y to be controlled, which is specified in $y_{set}$, for example. For other system equations, of course, there are other rules.

As explained in the introduction, the manipulated variable u ($u_R$) calculated using the oscillation controller 11 and/or a time derivative of the manipulated variable u is often limited for physical reasons depending on the implementation of the actuator 15, for example, $u_{min} \leq u \leq u_{max}$ and $\dot{u}_{min} \leq \dot{u} \leq \dot{u}_{max}$.

This limitation can lead to unwanted control behavior and instability. In order to avoid this problem, according to the invention, the manipulated variable u computed by the oscillation controller 11 is not limited subsequently as in the past, but the restriction $$\frac{d^n u}{dt^n_{min}}, \frac{d^n u}{dt^n_{max}}$$

of at least one time derivative $$\frac{d^n u}{dt^n}, n \geq 1$$

of the manipulated variable u is taken into account directly in the control law of the oscillation controller 11 in the calculation of the manipulated variable u, that is, for example, $$u = f\left(\frac{d^n u}{dt^n_{min}}, \frac{d^n u}{dt^n_{max}}\right)$$

or, for a controller that introduces damping $$\xi_{set}, u = f\left(\xi_{set}, \frac{d^n u}{dt^n_{min}}, \frac{d^n u}{dt^n_{max}}\right),$$

for example, the restriction of the first time derivative $\dot{u}_{min}$, $\dot{u}_{max}$ of the manipulated variable u. The manipulated variable u calculated by the oscillation controller 11 is therefore directly dependent on at least one restriction of a time derivative of the manipulated variable u. Usually, the manipulated variable u is also a function of the control error e, which in turn results from the desired value $y_{set}$ and the actual value $y_{act}$, or time derivatives thereof (as a rule the difference therefrom).

It should be noted that the restriction does not necessarily have to be a range with an upper and lower limit, but only an upper or lower limit is conceivable, with which only a maximum or minimum restriction is taken into account and the corresponding non-existent limitation in the calculation would disappear from u.

Due to the immediate consideration of the restriction $$\frac{d^n u}{dt^n_{min}}, \frac{d^n u}{dt^n_{max}}$$

of a time derivation $$\frac{d^n}{dt^n}$$

of the manipulated variable u in the calculation of the manipulated variable u, the associated negative effects of a subsequent restriction are omitted. The calculated manipulated variable u already fulfills the restriction, which is why the calculated manipulated variable u subsequently no longer has to be limited. In addition, the restriction of the manipulated variable u itself, i.e., $u_{min}$ and/or $u_{max}$, may additionally be taken into account in the calculation of the manipulated variable u, e.g., $$u = f\left(e, u_{min}, u_{max}, \frac{d^n u}{dt^n_{min}}, \frac{d^n u}{dt^n_{max}}\right)$$

or for a control law with damping $\xi_{set}$ also $$u = f\left(e, \xi_{set}, u_{min}, u_{max}, \frac{d^n u}{dt^n_{min}}, \frac{d^n u}{dt^n_{max}}\right).$$

The consideration of a restriction $$\frac{d^n u}{dt^n_{min}}, \frac{d^n u}{dt^n_{max}}$$

of the at least one time derivation of the manipulated variable u can also take place in other ways in the control law. In one possible embodiment, the control law of the oscillation controller 11 contains at least one controller parameter RP which depends on the restriction $$\frac{d^n u}{dt^n_{min}} \text{ and/or } \frac{d^n u}{dt^n_{max}}$$

of the at least one time derivative of the manipulated variable u, and possibly also of other restrictions $u_{min}$ and/or $u_{max}$ of the manipulated variable u, is, e.g.

$$u = f\left(e, RP\left(\frac{d^n u}{dt^n_{min}}, \frac{d^n u}{dt^n_{max}}\right)\right).$$

The controller parameter RP of the oscillation controller 11 may additionally be dependent on a system state that characterizes the oscillation of the controlled oscillation variable (e.g. $x_L$, $y_L$, $\beta$) of the technical system 1, for example, an oscillation amplitude A and/or at least one time derivative $$\frac{d^n A}{dt^n}, n \geq 1$$

of the oscillation amplitude A.

In a preferred embodiment, the restriction $$\frac{d^n u}{dt^n_{min}} \text{ and/or } \frac{d^n u}{dt^n_{max}}$$

of the at least one time derivative of the manipulated variable u, and possibly also the restriction $u_{min}$ and/or $u_{max}$ of the manipulated variable u itself, in a control law with damping $\xi_{set}$ (as a controller parameter RP of the oscillation controller 11) is used to adjust the damping $\xi_{set}$ in the control law. Thus, the damping $\xi_{set}$, and consequently also the manipulated variable u thus calculated, is itself dependent on the constraints of the manipulated variable u, i.e. $\xi_{set} = f(u_{min}, u_{max}, \frac{d^n u}{dt^n_{min}}, \frac{d^n u}{dt^n_{max}})$, whereby again at least the restriction $$\frac{d^n u}{dt^n_{min}}, \frac{d^n u}{dt^n_{max}}$$

at least one time derivative $$\frac{d^n u}{dt^n}, n \geq 1$$

of the manipulated variable u is taken into account. The control law of the oscillation controller 11 then results in $$u = f\left(\xi_{set}, \left(u_{min}, u_{max}, \frac{d^n u}{dt^n_{min}}, \frac{d^n u}{dt^n_{max}}\right)\right),$$

where $u_{min}$, $u_{max}$ are again optional. The manipulated variable u is thus again dependent on at least one restriction $$\frac{d^n u}{dt^n_{min}}, \frac{d^n u}{dt^n_{max}}$$

at least one time derivative $$\frac{d^n u}{dt^n}, n \geq 1$$

of the manipulated variable u. The above control law could be used in this case, for example, as $$u = \left(\frac{d^2 y_{set}}{dt^2} - \frac{d^2 y_{set}}{dt^2}\right) \frac{2(\xi_{set}(u_{min}, u_{max}, \dot{u}_{min}, \dot{u}_{max}) - \xi_0)}{\omega_0 i_B}$$

with a restriction of the first derivative of the manipulated variable u and the control error e in the form $$\left(\frac{d^2 y_{set}}{dt^2} - \frac{d^2 y_{set}}{dt^2}\right).$$

The damping $\xi_{set}$, or generally the controller parameter RP, is preferably dependent on the oscillation amplitude A and/or an amplitude $A_n$, $n \geq 1$ of at least one time derivative of the oscillation variable y to be controlled (e.g. $x_L$, $y_L$, $\beta$) of the technical system 1, so $$\xi_{set} = f\left(A, A_n, u_{min}, u_{max}, \frac{d^n u}{dt^n_{min}}, \frac{d^n u}{dt^n_{max}}\right),$$

again not all terms must be included, but at least one term with the oscillation amplitude A or amplitude $A_n$ of a time derivative of the oscillation variable y and at least a limitation of a time derivative of the manipulated variable u is included. If the current oscillation amplitude A is small, damping can be greater than with larger oscillation amplitudes A, with which the damping $\xi_{set}$, or in general the controller parameter RP, can be adaptively adapted to the respective oscillation state.

The current oscillation amplitude A can be measured either with suitable measuring sensors, for example by a camera system for detecting and evaluating the oscillation, or can be estimated using an oscillation amplitude observer 17. The oscillation amplitude observer 17 may be integrated with the oscillation control unit 16 (as in FIG. 5), for example as software on common hardware, or may also be implemented as separate hardware and software.

An oscillation amplitude observer 17 could be implemented in various ways, e.g. as a Kalman filter. In an advantageous embodiment, an oscillation amplitude observer 17 is used, which estimates the maximum oscillation amplitude A and/or (as required) the amplitude of the time derivatives of the oscillation variable y from the time derivatives of the actual values $y_{act}$ and the target values $y_{set}$. For this purpose, a sinusoidal oscillation is assumed for the control error of the first and second time derivative of the oscillation variable y to be controlled, in the form $$\frac{dy_{set}}{dt} - \frac{dy_{set}}{dt} = A_1 \sin(\omega_0 t) \text{ and } \frac{d^2 y_{set}}{dt^2} - \frac{d^2 y_{set}}{dt^2} = A_1 \omega_0 \cos(\omega_0 t).$$

Hence, the maximum amplitude A and the amplitudes $A_n$ of the time derivatives of the oscillation variable y can be easily calculated and result in $A_3 = A_2 \omega_0 = A_1 \omega_0^2 = A \omega_0^3$.

The advantage of this approach results, together with the above advantageous control law of the oscillation controller 11 for the active introduction of damping $\xi_{set}$, in which the control error $$e = \frac{d^2 y_{set}}{dt^2} - \frac{d^2 y_{act}}{dt^2}$$

occurs. The approach allows the simple consideration of the maximum oscillation amplitude A in the damping $\xi_{set}$, for example, as follows $$\xi_{set} = \min\left\{\frac{\omega_0 i_n \min(|\dot{u}_{min}|, |\dot{u}_{max}|)}{2A_1 \omega_0} + \xi_0, \frac{\omega_0 i_n \min(|\ddot{u}_{min}|, |\ddot{u}_{max}|)}{2A_1 \omega_0^2} + \xi_0, \xi_{set0}\right\}.$$

Therein, the damping $\xi_{set0}$ is a predetermined or predefinable adjustment parameter of the oscillation controller 11. If other time derivatives $$\frac{d^n}{dt^n}$$

of the manipulated variable u are limited, of course other and/or additional and/or fewer terms must be taken into account, for example only for $\dot{u}$ or only for $\ddot{u}$ or additionally for $\dddot{u}$. Thus, the restrictions on the damping $\xi_{set}$ flow directly into the calculation of the manipulated variable u in the control law of the oscillation controller 11 and no longer have to be applied subsequently.

This approach can also be used for a dead time correction. The dead time $T_t$ of the oscillatable technical system is the time that elapses between changing the manipulated variable u and the corresponding change in the actual value $y_{act}$ and can be assumed to be known. The dead time $T_t$ can be measured, for example, or can also be determined by identification methods. For the dead time correction, the control error lying by the dead time $T_t$ in the future is calculated and used for the calculation of the manipulated variable u. For the control error $$e = \left(\frac{d^2 y_{set}}{dt^2} - \frac{d^2 y_{act}}{dt^2}\right)$$

the approach $$e = \underbrace{A_2 \cos(\omega_0 t)}_{\varphi_{act}}$$

was chosen. From this, the current phase angle $\varphi_{act}$ can be calculated from $$\varphi_{act} = a \cos\left(\frac{e}{A_2}\right).$$

The future control error $$e_t = \left(\frac{d^2 y_{set}}{dt^2} - \frac{d^2 y_{act}}{dt^2}\right)_t$$

then results from $e_1 = A_2 \cos(\varphi_{act} + \Delta\varphi)$, with $\Delta\varphi = T_1 \cdot \omega_0$. For the control law described above, the manipulated variable u then results, for example, as $$u = e_t \frac{2(\xi_{set}(u_{min}, u_{max}, \dot{u}_{min}, \dot{u}_{max}) - \xi_0)}{\omega_0 j_B},$$

or generally as $$u = f\left(e_t, u_{min}, u_{max}, \frac{d^n u}{dt^n_{min}}, \frac{d^n u}{dt^n_{max}}\right) \text{ or } u =$$

-continued
$$f\left(e_t, \xi_{set}, u_{min}, u_{max}, \frac{d^n u}{dt^n_{min}}, \frac{d^n u}{dt^n_{max}}\right) \text{ or } u =$$

$$f\left(e, RP\left(u_{min}, u_{max}, \frac{d^n u}{dt^n_{min}}, \frac{d^n u}{dt^n_{max}}\right)\right) \text{ or } u =$$

$$f\left(e_t, \xi_{set}\left(u_{min}, u_{max}, \frac{d^n u}{dt^n_{min}}, \frac{d^n u}{dt^n_{max}}\right)\right),$$

where again, not all parts $$u_{min}, u_{max}, \frac{d^n u}{dt^n_{min}}, \frac{d^n u}{dt^n_{max}}$$

must be included, but only at least a time derivative of a restriction $$\frac{d^n u}{dt^n_{min}}, \frac{d^n u}{dt^n_{max}}.$$

Figure 5:
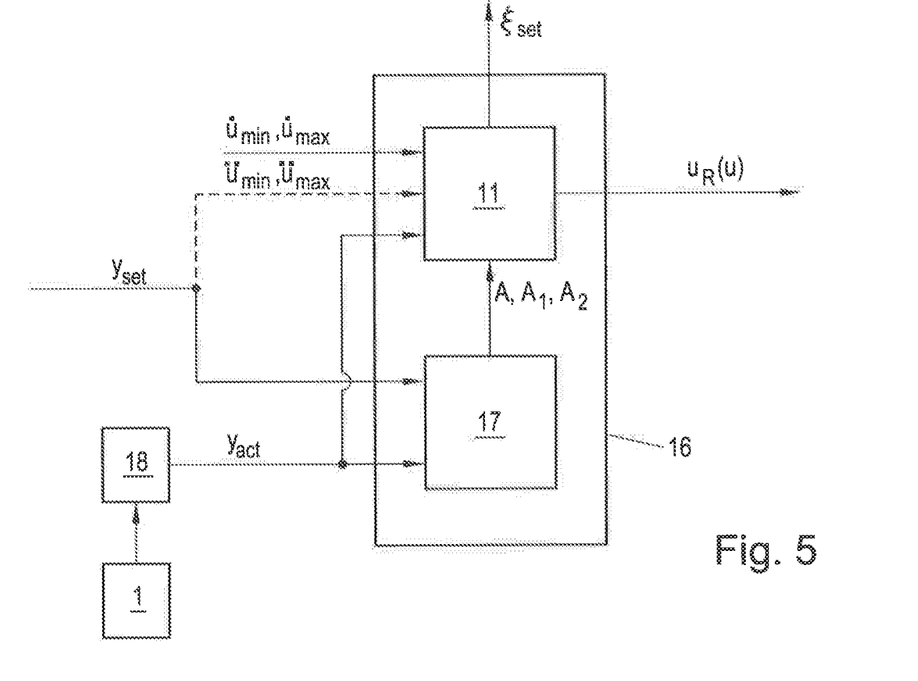
FIG. 5 shows an oscillation controller with an oscillation amplitude observer.

In the exemplary embodiment according to FIG. 5, the oscillation amplitude observer 17 calculates the actual values $y_{act}$ and/or the time derivatives of the actual value $y_{act}$ and target values $y_{set}$ and/or the time derivatives of the target value $y_{set}$ of the technical system 1, for example $$x_L, \frac{d^n x_L}{dt^n}, x_T$$

and $\omega_0$, the maximum oscillation amplitude A and the required amplitudes $A_n$, e.g. $A_1$, $A_2$, the oscillation of the time deviations of the oscillation variable y. These are used in the oscillation controller 11 to adjust the damping $\xi_{set}$ in the control law, for example in each time step of the control or in every $x^{th}$ time step of the control, and to calculate therefrom the manipulated variable u ($u_R$). The current damping $\xi_{set}$ can also be output so that it can be used in other components of the operating controller 10.

The oscillation variable controller 14 may be implemented with any control law, for example as a proportional-derivative controller (PD), proportional-integral controller (PI) or proportional-integral-derivative controller (PID) controller or as a state controller, and is intended in a known manner to compensate for the error between a specification of a target value $y_{set}$ (e.g. $x_{Lset}$, $y_{Lset}$, $\beta_{set}$) of the oscillation variable y to be controlled and the actual value $y_{act}$ of the oscillation variable y to be controlled. The design of such a controller is well known.

In an advantageous embodiment, the control error between the target value $y_{set}$ and the actual value $y_{act}$ is not compensated for as usual in the oscillation variable controller 14, but the deviation between an estimated final value $y_{end}$ of the oscillation variable, for example an estimated end position $x_{Lend}$, $y_{Lend}$ or a final rotational angle $\beta_{end}$, which is achieved after the oscillation of the oscillation variable has been compensated for, and the target value $y_{set}$. Thus, an advantageous decoupling of the oscillation controller 11, which adjusts to the actual values $y_{act}$, from the oscillation variable controller 14 is achieved, whereby the control behavior of the oscillation controller 11 is not affected by the oscillation variable control.

Figure 6:
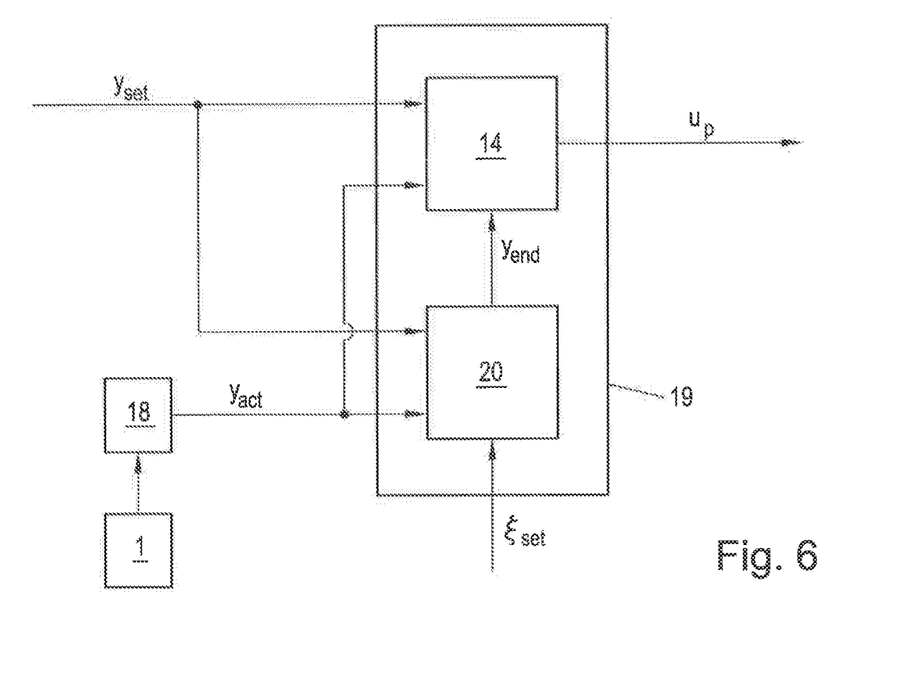
FIG. 6 shows an oscillation variable controller with final value observer.

Since the estimated final value $y_{end}$ cannot be measured directly, it is preferably estimated in a final value observer 20 from other existing measured variables of the technical system 1, as explained with reference to FIG. 6. The final value observer 20 could in turn be implemented in a variety of ways. A simple implementation can be designed, for example, as a bandstop filter, for example as a notch filter. Preferably, however, a state observer is implemented which observes the final value $y_{end}$ of the oscillation variable as the constant component of the oscillation variables y to be controlled, for example $x_L$, $y_L$, β. For the final value observer 20, a system equation for the oscillation of the oscillation variable is then used again, for example the form $$\frac{d}{dt}\begin{pmatrix} y_{end} \\ \tilde{y} \\ \frac{d\tilde{y}}{dt} \end{pmatrix} = \begin{pmatrix} 0 & 0 & 0 \\ 0 & 0 & 1 \\ 0 & -\omega_0^2 & -2\xi_{set}\omega_0 \end{pmatrix}\begin{pmatrix} y_{end} \\ \tilde{y} \\ \frac{d\tilde{y}}{dt} \end{pmatrix} + \begin{pmatrix} 1 \\ 0 \\ 0 \end{pmatrix}\frac{dy_{set}}{dt}.$$

There $\tilde{y}$ denotes the alternating component of the oscillation variable y to be controlled. Further, the damping $\xi_{set}$ is included, which is preferably adaptively adapted as described in the oscillation controller 11. The last part with the time derivation of the target value $y_{set}$ is optional. When used, the target value $y_{set}$, or specifically the time derivative of the target value, is systematically taken into account, which equates to an advantageous feedforward control. For this system equation, an extended Kalman filter can be designed with well-known methods to calculate the final value $y_{end}$.

However, the final value observer 20 could also be designed with a similar approach to the oscillation amplitude observer 17, that is, for example, $y=y_{end}+A_{\tilde{y}}\sin(\omega_0 t)$ with the amplitude $A_{\tilde{y}}$ of the alternating component $\tilde{y}$.

Since the system parameters, in particular the natural frequency $\omega_0$, need not be constant but can depend on other variables, such as the natural frequency $\omega_0$ which is dependent on the rope length $l_H$ for a lifting device, an adaptive oscillation variable controller 14 can advantageously also be designed. In a PID controller, the gain $k_p$ (of the proportional part), the reset time $T_N$ (of the integral part) and the derivative time $T_V$ (of the differential part), for example, are included as controller parameters of the oscillation variable controller 14, which must be set to the respective technical system 1 to be controlled in order to ensure stability and the desired control behavior. These controller parameters are usually dependent on the system parameters, for example on the system gain $i_B$, the system damping $\xi_0$ and/or the natural frequency $\omega_0$. For an adaptive oscillation variable controller 14, the controller parameters $k_p$, $T_N$, $T_V$ for a reference system with predetermined system parameters, for example with $i_{Bref}=1$ and $\omega_{0ref}=1$, can be set to a desired control behavior (e.g. rise time, overshoot, etc.), leading to reference controller parameters $k_{p0}$, $T_{N0}$, $T_{V0}$. For example, by frequency characteristic methods from a desired rise time and desired overshoot, the controller parameters $k_{p0}$, $T_{N0}$, $T_{V0}$ could be determined. The controller parameters can then be calculated e.g. in the form $$k_p = \frac{k_{p0}}{i_H}\omega_0(l_H), \quad T_N = \frac{T_{N0}}{\omega_0(l_H)}, \quad T_V = \frac{T_{V0}}{\omega_0(l_H)}$$

and adapt to the respective system conditions, in particular rope length $l_H$. For other control laws, such as PI controller, or other dependencies the procedure can be analogous.

For the manipulated variable up calculated with the oscillation variable controller 14, in turn, restrictions of the manipulated variable u can be taken into account. If the oscillation variable control is combined with a feedforward control 12, only very small manipulated variables up will result. Thus, any restrictions will hardly be reached, which is why in this case it does not pose a problem if the restrictions are applied to the calculated manipulated variables up or even not taken into account.

For various controllers and components of the operating controller 10, an actual value $y_{act}$ of the oscillation variable y to be controlled, as well as time derivatives thereof, in particular $$\frac{dy}{dt}$$

(i.e. the speed) and $$\frac{d^2 y}{dt^2}$$

(i.e. the acceleration), possibly also higher derivatives, is required. The oscillation variable y to be controlled is again, for example, the load position $x_L$ ($y_L$) or a rotational angle β or the position of a vehicle of a long stator linear motor or an electrical voltage or a hydraulic pressure. The required actual values $y_{act}$ can either be measured on the technical system 1 with suitable measuring sensors, or estimated in a state observer 18 from other measured variables. State observers 18 are well known in various embodiments, for example as Kalman filters, extended Kalman filters or Luenberger observers. For the state observer 18, a system equation for the oscillation variable y of the technical system 1 can again be written, for the oscillating oscillation in the X direction with the load position $x_L$, for example $$\frac{d}{dt}\begin{pmatrix} x_L \\ \frac{dx_L}{dt} \end{pmatrix} = \begin{pmatrix} 0 & 1 \\ -\omega_0^2 & -2\xi_0\omega_0 \end{pmatrix}\begin{pmatrix} x_L \\ \frac{dx_L}{dt} \end{pmatrix} + \begin{pmatrix} 0 \\ i_B\omega_0^2 \end{pmatrix}x_T.$$

For the other degrees of freedom of movement of the lifting device or other technical systems 1, similar system equations result. For this system equation, the state observer 18 can then be designed using known methods, for example a Kalman filter. Such a state observer 18 then calculates from the existing measured variables, for example, the load position $x_L$ and the position $x_T$ of the moving part (or other measured variables) of the oscillatable technical system 1, the first and second time derivatives (possibly also higher derivatives) of the oscillation variable $$\frac{dy}{dt}, \frac{d^2 y}{dt^2},$$

for example, the load position $$\frac{dx_L}{dt}, \frac{d^2x_L}{dt^2}.$$

For the other degrees of freedom of movement or other oscillation variables y, the procedure can be analogous.

Of course, the oscillation controller 11 can also compensate oscillations of a plurality of oscillation variables y of a technical system 1, for example a pendulum oscillation in the X direction and a torsional oscillation about the vertical axis of a lifting device. For this purpose, the oscillation controller 11 is designed as described above for at least one, preferably all, oscillation variables y to be controlled. Of course, it is also possible to provide a separate oscillation control unit 16 with oscillation controllers 11 for each or several oscillation variables y to be controlled.

A memory (not shown), e.g., a non-transitory computer readable medium or media, can be provided to store a set of instructions that can be executed by a processor of the oscillation controller 11 to perform any of the methods or computer based functions disclosed herein, either alone or in combination with the other described devices. The memory, accessible by the processor, can be part of the oscillation controller 11, part of the operating controller 10 or remote from the operating controller 10, e.g., a remotely located server, memory, system, or communication network or in a cloud environment. Further, the above-identified memory or one or more separate memories can be provided to store a set of instructions that can be executed by a processor of feedforward control 12 and/or a processor or rope length controller 13 to perform any of the methods or computer based functions disclosed herein, either alone or in combination with the other described devices. Feedforward control 12 and/or rope length controller 13 can include a memory accessible by their processors, or the instructions for control 12 and/or controller 13 can be stored in a memory in the operating controller or in one or more memories residing remotely from the operating controller 10, e.g., a remotely located server, memory, system, or communication network or in a cloud environment.

Moreover, in addition to the foregoing, it is to be understood and those skilled in the art will readily appreciate that the blocks and/or modules illustrated in the drawings, e.g., controllers 10-14 and 16-20 are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. Further, these blocks and/or modules can be formed as application specific integrated circuits (ASICs) or other programmable integrated circuits, and, in the case of the blocks and/or modules, which can be implemented by microprocessors or similar, they may be programmed using software (e.g., microcode) to perform various functions discussed herein and may optionally be driven by firmware and/or software. Alternatively, each block and/or module may be implemented by dedicated hardware, or as a combination of dedicated hardware to perform some functions and a processor (e.g., one or more programmed microprocessors and associated circuitry) to perform other functions.

It is noted that the foregoing examples have been provided merely for the purpose of explanation and are in no way to be construed as limiting of the present invention.

While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed:

1. A method for compensating oscillations of at least one oscillation variable (y) of an oscillatable technical system to be controlled with an oscillation controller having a control law, the method comprising;
   calculating from at least one of:
   a target value ($Y_{set}$) and an actual value ($Y_{act}$) of the oscillation variable (y) to be controlled or
   a time derivative of a target value ($Y_{set}$) and of an actual value ($Y_{act}$) of the oscillation variable (y) to be controlled,
   a manipulated variable (u) for an actuator of the oscillatable technical system,
   wherein in the control law for calculating the manipulated variable (u) takes account of a restriction $$\left(\frac{d^n u}{dt^n}_{min}, \frac{d^n u}{dt^n}_{max}\right)$$

of at least one time derivative of the manipulated variable (u);
   transmitting the manipulated variable to the actuator; and
   operating the actuator to modify at least one parameter of the oscillatable technical system according to the received manipulated variable to compensate for oscillations of the at least one oscillation variable in the oscillatable technical system.

2. The method of claim 1, wherein the control law contains a controller parameter, which is dependent on the restriction $$\left(\frac{d^n u}{dt^n}_{min}, \frac{d^n u}{dt^n}_{max}\right)$$

of the at least one time derivative of the manipulated variable (u).

3. The method of claim 2, wherein the control law contains damping ($\xi_{set}$) to be introduced into the oscillatable technical system as the controller parameter.

4. The method of claim 2, wherein the controller parameter is dependent on a system state.

5. The method of claim 4, wherein the controller parameter is dependent on an oscillation amplitude of the oscillation and/or an amplitude of a time derivative of the oscillation.

6. The method of claim 5, wherein an oscillation amplitude observer is implemented, which from time derivatives of the target values $$\left(\frac{dy_{set}}{dt}, \frac{d^2y_{set}}{dt^2}\right)$$

and the actual values $$\left(\frac{dy_{act}}{dt}, \frac{d^2y_{act}}{dt^2}\right)$$

and/or the actual values ($y_{act}$) and target values ($y_{set}$) of the oscillation variable (y) to be controlled, calculates the oscillation amplitude of the oscillation and/or the amplitude of a time derivative of the oscillation.

7. The method according to claim 1, wherein in the calculation of the manipulated variable (u) a dead time of the oscillatable technical system is taken into account.

8. The method of claim 7, wherein a future control error ($e_t$) following the dead time is calculated and this future control error ($e_t$) is taken into account in the calculation of the manipulated variable (u).

9. The method according to claim 1, wherein a feedforward control is implemented, which calculates from target values ($y_{set}$) and/or at least one time derivative of a target value $$\left(\frac{d^n y_{set}}{dt^n}\right)$$

of the oscillation variable (y) a feedforward control manipulated variable ($u_V$), which is added to determine the manipulated variable (u) for the actuator with the manipulated variable ($u_R$) calculated by the oscillation controller.

10. The method according to claim 1, wherein an oscillation variable controller is implemented, which compensates for the deviation between a target value ($y_{set}$) of the controlled oscillation variable (y) and a final value ($y_{end}$) of the oscillation variable (y), as the value of the oscillation variable (y) reached after the compensation for the oscillation.

11. The method of claim 10, wherein the final value ($y_{end}$) is calculated in a final value observer which calculates a constant component of the oscillation of the oscillation variable (y) to be controlled as the final value ($y_{end}$).

12. The method according to claim 1, wherein the oscillation technical system further comprises an oscillating load bearing element, and
wherein, in compensating for the oscillations for at least one oscillation variable (y), the actuator is operated to reduce oscillations in the oscillating load bearing element.

13. The method according to claim 1, wherein the actuator comprises a drive of a moving part of a mechanical system of the oscillatable technical system.

14. An oscillation controller for compensating oscillations of at least one oscillation variable (y) of an oscillatable technical system to be controlled, the oscillation controller comprising:
a processor; and
a memory including instructions for a control law that, when executed by the processor, cause the processor to perform operations including:
calculating, from at least one of:
a target value ($y_{set}$) and an actual value ($y_{act}$) of the controlled oscillation variable (y) or
a time derivative of a target value ($y_{set}$) and of an actual value ($y_{act}$),
a manipulated variable (u) for an actuator of the oscillatable technical system,
wherein the control law for calculation of the manipulated variable (u) takes account of a restriction $$\left(\frac{d^n u}{dt^n}\bigg|_{min}, \frac{d^n u}{dt^n}\bigg|_{max}\right)$$

of at least one time derivative of the manipulated variable (u) and the oscillation controller is structured to transmit the calculated manipulated variable (u) to the actuator,
whereby the actuator is operated to modify at least one parameter of the oscillatable technical system according to the received calculated manipulated variable (u) to compensate for oscillations of the at least one oscillation variable (y) in the oscillatable technical system.

15. The oscillation controller of claim 14, wherein the control law contains a controller parameter, which is dependent on the restriction $$\left(\frac{d^n u}{dt^n}\bigg|_{min}, \frac{d^n u}{dt^n}\bigg|_{max}\right)$$

of the at least one time derivative of the manipulated variable (u).

16. The oscillation controller according to claim 15, wherein the controller parameter is dependent on at least one of an oscillation amplitude of the oscillation or an amplitude of a time derivative of the oscillation.

17. The oscillation controller of claim 16, further comprising an oscillation amplitude observer, which calculates at least one of an oscillation amplitude of the oscillation or an amplitude of a time derivative of the oscillation from at least one of
time derivatives $$\left(\frac{dy_{act}}{dt}, \frac{d^2y_{act}}{dt^2}\right)$$

of the actual values ($y_{act}$) and time derivatives $$\left(\frac{dy_{set}}{dt}, \frac{d^2y_{set}}{dt^2}\right)$$

of the target values ($y_{set}$)
or actual values ($y_{act}$) and target values ($y_{set}$) of the oscillation variable (y) to be controlled.

18. The oscillation controller of claim 14, further comprising a feedforward control that calculates from at least one of target values ($y_{set}$) or at least one time derivation of a target value $$\left(\frac{d^n y_{set}}{dt^n}\right)$$

of the oscillation variable (y), a feedforward control manipulated variable ($u_V$), which is added to a manipulated variable ($u_R$) calculated by the oscillation controller to determine the manipulated variable (u) for the actuator and/or an oscillation variable controller is provided which compensates for the deviation between a target value ($y_{set}$) of the oscillation variable (y) to be controlled and a final value ($y_{end}$) of the oscillation variable (y), as the value of the oscillation variable (y) reached after the oscillation has been compensated for.

19. The oscillation controller according to claim 18, further comprising a final value observer is provided, which calculates a constant component of the oscillation of the oscillation variable (y) to be controlled as the final value ($y_{end}$).

20. The oscillation controller according to claim 14, wherein the oscillation technical system further comprises an load bearing element capable of oscillation.

21. The oscillation controller according to claim 14, wherein the actuator comprises a drive of a moving part of a mechanical system of the oscillatable technical system.

\* \* \* \* \*